Dec. 2, 1969  P. A. G. LEPELLETIER  3,481,433
BRAKE WITH DOUBLE FACE CLAMPING AND BRAKING SYSTEM COMPRISING
SUCH BRAKES ESPECIALLY FOR AUTOMOBILE VEHICLES
Filed Jan. 29, 1968  4 Sheets-Sheet 3

INVENTOR
PIERRE ANDRÉ GEORGES LEPELLETIER
BY Young + Thompson
ATTYS.

Dec. 2, 1969　　　P. A. G. LEPELLETIER　　　3,481,433
BRAKE WITH DOUBLE FACE CLAMPING AND BRAKING SYSTEM COMPRISING
SUCH BRAKES ESPECIALLY FOR AUTOMOBILE VEHICLES
Filed Jan. 29, 1968　　　　　　　　　　　　　　4 Sheets-Sheet 4
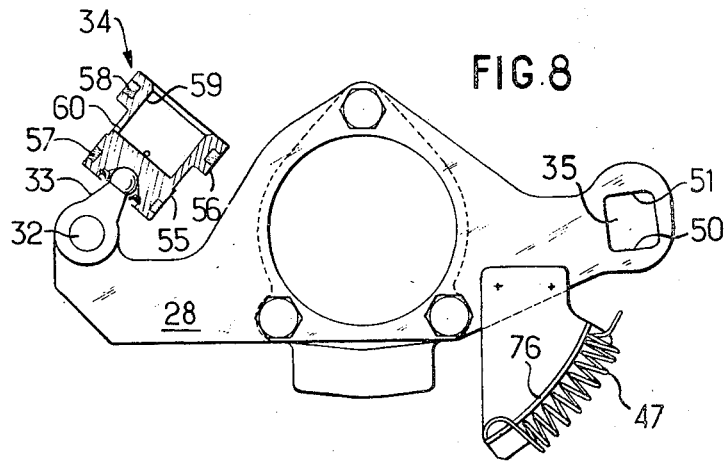
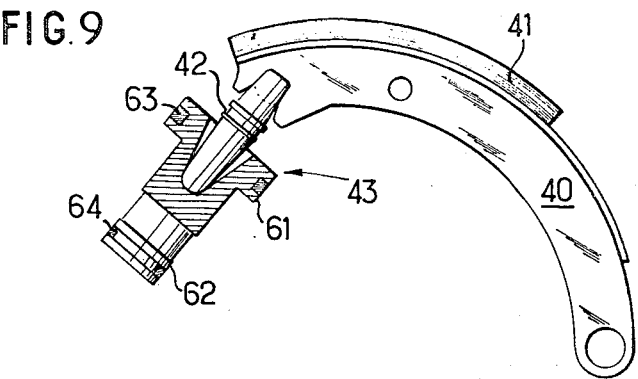
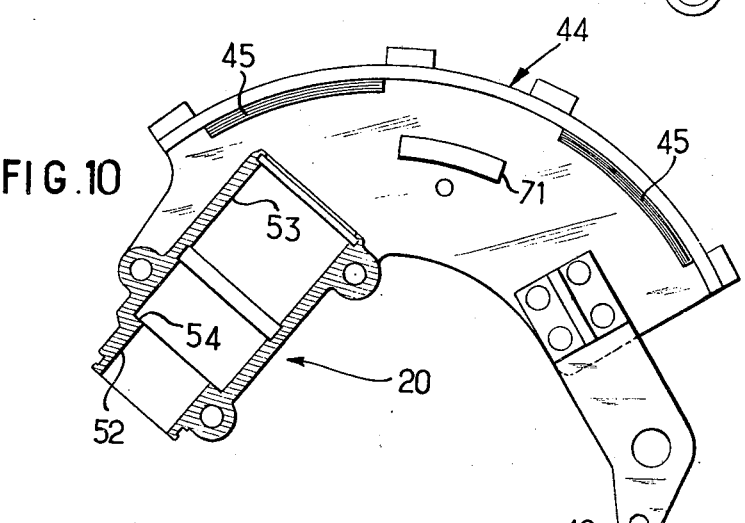
INVENTOR
PIERRE ANDRÉ GEORGES
LEPELLETIER
By Young & Thompson
ATTYS.

United States Patent Office 3,481,433
Patented Dec. 2, 1969

3,481,433
BRAKE WITH DOUBLE FACE CLAMPING AND BRAKING SYSTEM COMPRISING SUCH BRAKES ESPECIALLY FOR AUTOMOBILE VEHICLES
Pierre André Georges Lepelletier, Chatou, France, assignor to Societe Anonyme Francaise du Ferodo, Paris, France, a French company
Filed Jan. 29, 1968, Ser. No. 701,281
Claims priority, application France, Feb. 7, 1967, 93,906
Int. Cl. F16d 15/06, 51/52
U.S. Cl. 188—79.5
9 Claims

ABSTRACT OF THE DISCLOSURE

A brake of the gripped-drum type comprising a rotating annular member with an axial rim having inner and outer faces, a fixed plate, two shoes associated with said fixed plate and intended to be applied in frictional contact against the axial rim of said annular member, one of the said shoes being outside and the other inside the said axial rim, and hydraulic control means comprising a cylinder and two pistons adapted to cause said axial rim to be gripped between the two shoes, said cylinder being adjacent the annular member and having its axis arranged substantially tangentially, the two shoes having their extremities remote from the cylinder articulated one on the other by means of a movable pivot.

---

The brakes most frequently utilized on automobile vehicles are drum-brakes with two shoes arranged inside the drum, and disc-brakes having two shoes arranged at the point on the periphery of the disc and adapted to grip the latter between them along a direction parallel to the axis of the disc. In drum-brakes, the grip of the shoes is effected by the rotational movement of the drum, which makes it possible to render these brakes sensitive, in a desired manner, to the winding phenomenon, and in particular to render them self-applying. However, when these brakes are subjected to heating, the increase in diameter of the drum has the effect of modifying the gripping conditions of the shoes, which interferes with correct operation.

Disc-brakes are not subject to this latter disadvantage, but they are not generally self-applying.

Brakes of the so-called gripped-drum type have also been proposed, that is to say in which a cylindrical friction track receives on each side two gripping members acting as in a disc-brake, but in a radial direction.

These gripped-drum brakes are of considerable technical advantage from the point of view of manufacture and overall size, but they have practically not been utilized up to the present time in the automobile industry, because their conditions of operation are lacking in various respects, and especially in the absence of self-application.

The present invention provides a brake of the gripped-drum type, comprising a rotating annular member with an axial rim having inner and outer faces, a fixed plate, two shoes associated with the said fixed plate and intended to be applied in frictional contact against the axial rim of the said annular member, one of the shoes being outside and the other inside the said axial rim, and hydraulic control means comprising a cylinder and two pistons adapted to cause the axial rim to be gripped between the two shoes, this brake being of convenient and compact construction, having excellent operation and great safety.

According to the invention, the said cylinder is adjacent to the annular member and has its axis arranged substantially tangentially, the two shoes having their extremities remote from the cylinder articulated one on the other by means of a movable pivot.

This arrangement has the effect of reducing the overall size, ensuring a particularly simple and robust assembly and permitting the brake to be made self-applying.

It is preferably the outer shoe which is coupled to the cylinder, while the second piston is coupled to the inner shoe.

According to the invention, the first and second pistons define in the cylinder two chambers respectively coupled to two hydraulic circuits, thus providing a safety measure in the event of failure of one of the circuits. More particularly, the cylinder comprises a first bore and a second bore in alignment, the second bore having a larger diameter than the first, the first piston being hollow and having two bearing surfaces respectively engaged in the two bores, the second piston having two bearing surfaces of which one is engaged in the second bore while the other is engaged in the recess of the first piston, one of the chambers known as the primary chamber being defined both by the recess of the first piston limited by the second piston and by the space of the bores limited by the two bearing surfaces of the first piston, while the other chamber, known as the secondary chamber, is defined in the second bore between the two pistons. A device for taking-up wear of the linings of the brake-shoes is preferably provided in the cylinder and acts between this latter and the second piston.

In a preferred form of embodiment, the differential annular section of the two bores is greater than the full section of the recess of the first piston.

In addition, according to the invention, centering means are provided to define the position of rest and comprise a spring coupled to the fixed plate and connected to the two shoes in the vicinity of the pivotal shaft that defines their pivotal axis. This spring tends to maintain this pivotal shaft applied against the abutment means of the fixed plate and is preferably kept incurved by a guide so as to be centered on the axis of the annular member.

In one form of construction of the invention, the abutment means of the fixed plate comprise one side of an elongated slot in which the pivotal shaft of the shoes is engaged, and which has an opposite side constituting a safety abutment means in case of failure of a circuit.

The two shoes are preferably held one with respect to the other and as a whole with respect to the fixed plate, by means of elastic systems.

The present invention also provides a braking installation for an automobile vehicle, of which at least one of the axles is equipped with two brakes of the gripped axial rim type as indicated above, in which a master cylinder is adapted to drive equal or proportional volumes of fluid into the primary chambers of the two brakes, while the secondary chambers of these brakes are interconnected by a hydraulic balancing circuit.

The objects, characteristic features and advantages of the invention will further be brought out in the description which follows below of one embodiment chosen by way of example with reference to the accompanying drawings, in which:

FIG. 8 is a partial view showing only the fixed plate and one of the pistons of FIG. 2;

FIG. 9 is a partial view showing only the inner shoe and the other piston of FIG. 2;

FIG. 10 is a partial view showing only the outer shoe and the cylinder of FIG. 2.

Figure 1:
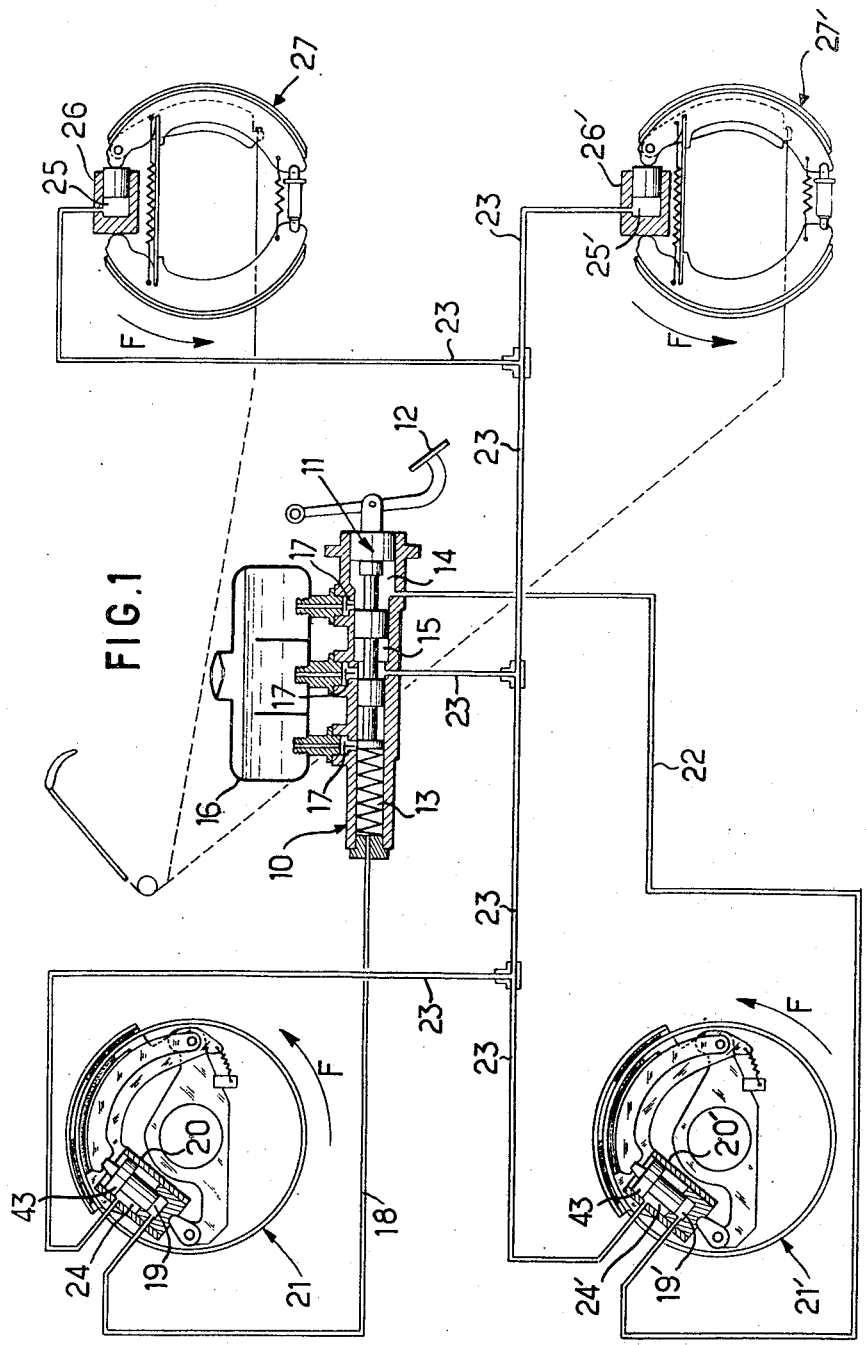
FIG. 1 is a general diagrammatic view of a braking installation, comprising brakes in accordance with the invention.

Reference will first be made to the diagram of FIG. 1, which relates to a braking installation of an automobile vehicle, of which the master cylinder is shown at 10. This latter comprises three stepped bores receiving a master-piston 11 actuated by a brake pedal 12. The master piston 11 defines with the said bores three chambers 13, 14 and 15 associated with a tank 16 through the intermediary of valves 17 which are half-open when at rest and are closed as soon as the pedal 12 is depressed.

One of the chambers, 13, is connected by a conduit 18 to the so-called primary chamber 19 of a wheel-cylinder 20 of the right-hand front brake 21. Another chamber 14 is connected by a conduit 22 to the so-called primary chamber 19' of a wheel-cylinder 20' of the left-hand front brake 21'. The last chamber 15 which in the example shown is located between the chambers 13 and 14 is connected by a conduit 23, on the one hand to the so-called secondary chamber 24 of the wheel-cylinder 20 of the right-hand front brake 21, and on the other hand to the so-called secondary chamber 24' of the wheel-cylinder 20' of the left-hand front brake 21'. The conduit 23 is also connected to the chambers 25 and 25' of the wheel-cylinders 26 and 26' with single supply, of the right-hand rear brake 27 and the left-hand rear brake 27' respectively.

These rear brakes 27 and 27' are of the type with two shoes arranged in the interior of a drum and acting as self-releasing brakes during the course of braking on forward running (arrow F) and as self-applying brakes during the course of braking in reverse.

The front brakes will now be described in more detail, for example the right-hand front brake, as shown in FIGS. 2 to 10.

The front brake 21 comprises a fixed plate 28 which is rigidly secured by screws 29 to the stub-axle 30, and which carries a wheel-disc 31 of circular dished shape. On the plate 28 (FIGS. 2 and 8) is pivotally mounted at 32 a crank-arm 33 associated with a piston 34 known as the primary piston, of the wheel cylinder 20, and has an elongated slot 35 diametrically opposite to the pivot 32. The purpose of this elongated slot will become apparent later.

Figure 2:
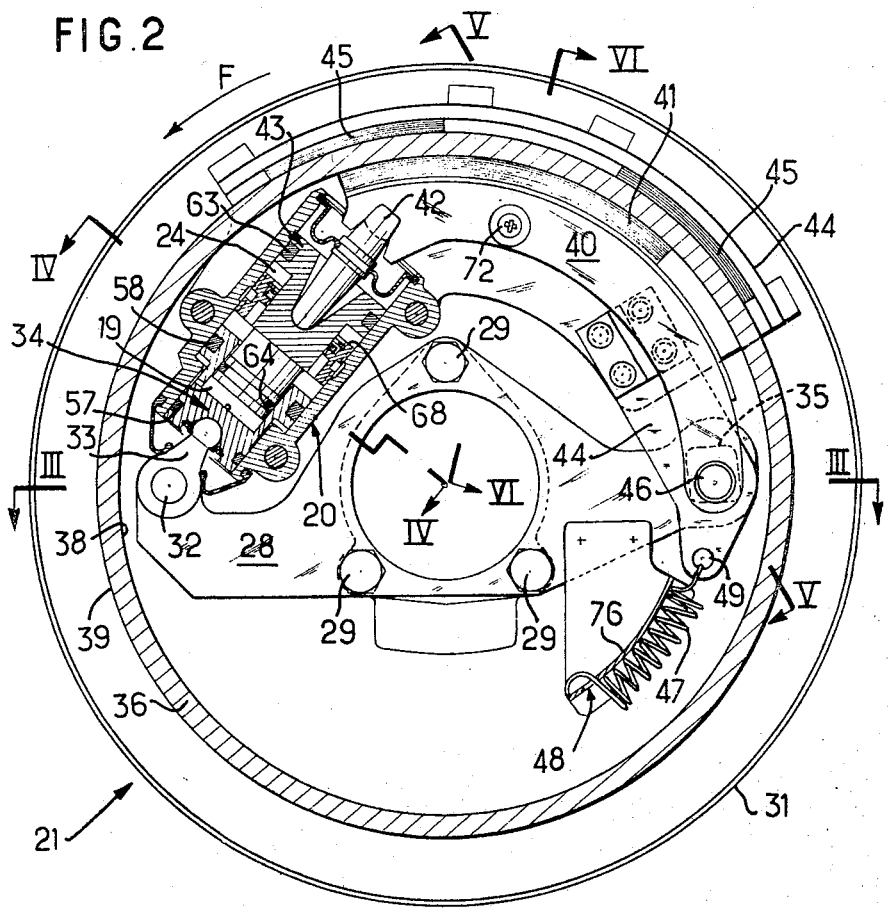
FIG. 2 is a view in elevation on a larger scale, with parts in cross-section, of a brake according to the invention.
Figure 3:
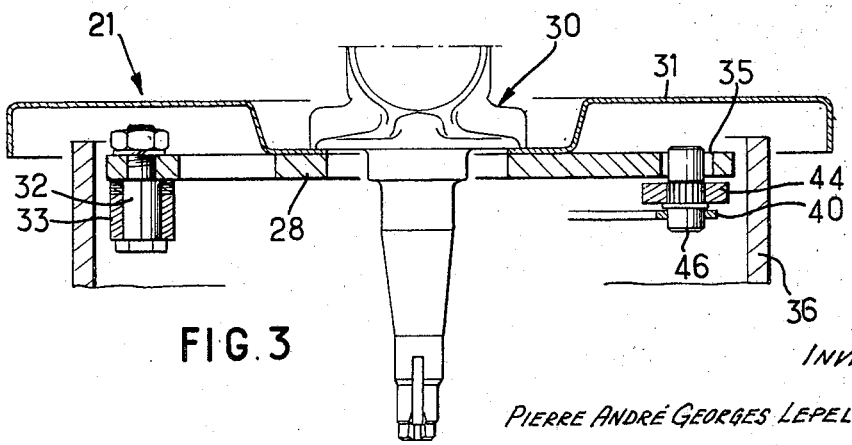
FIGS. 3, 4, 5 and 6 are views of this brake in cross-sections taken respectively along the lines III—III, IV—IV, V—V and VI—VI of FIG. 2.
Figure 4:
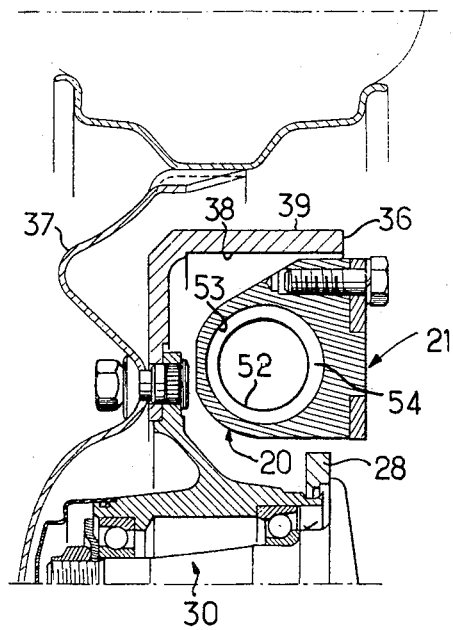
Figure 5:
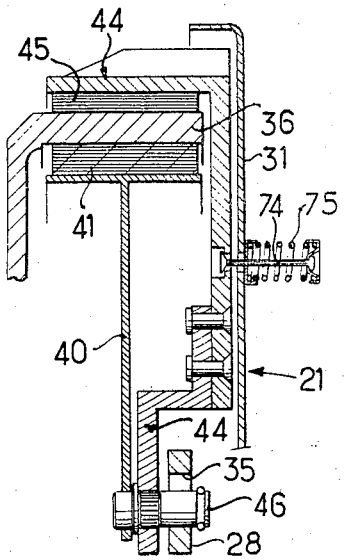
Figure 6:
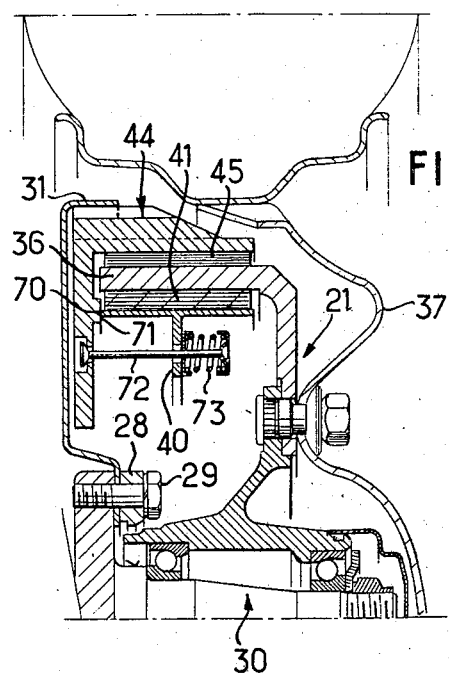

The brake 21 comprises a drum 36 which is rotatably mounted about the stub-axle 30, and which is rigidly fixed to the wheel-web 37 (FIG. 6). The drum 36 is of the so-called gripped type and has a double peripheral track, an internal track 38 and an external track 39 (FIGS. 2 and 4).

With the internal track 38 (FIGS. 2 and 9) an internal shoe 40 co-operates frictionally, the friction lining being shown at 41. The shoe 40 is associated with a crank-rod 42 of a piston 43, known as the secondary piston, of the wheel-cylinder 20.

With the outer track 39 (FIGS. 2 and 10) an external shoe 44 co-operates frictionally, the friction linings being shown at 45. The shoe 44 is rigidly fixed to the wheel-cylinder 20 itself. In addition, a shaft 46 (FIGS. 2, 3 and 5) is fixed to the external shoe 44. This shaft 46 is engaged with play, especially circumferential, in the elongated slot 35 and the internal shoe 40 is pivotally mounted on this shaft.

The peripheral cylindrical portion of the shoe 40 (FIGS. 6 and 10) has one of its edges 70 which is guided against at least one projection 71 of the shoe 44, this guiding action being maintained by an elastic system comprising a rod 72 and a spring 73.

The assembly of the shoes 40 and 44 is held with respect to the bowl 31 (FIG. 5) by means of a further elastic system comprising a rod 74 and a spring 75.

A centering spring 47 (FIGS. 2 and 8) is coupled at 48 to the fixed plate 28 and at 49 to the outer shoe 44. It tends to maintain the shaft 46 applied against one side 50 (FIGS. 2 and 8) of the slot 35, of which the opposite side is shown at 51.

The centering spring 47 is helicoidal and is applied against an arcuate guide 76 concentric with the drum 36 and secured to the fixed plate 28. The spring 47 is thus incurved in a circular arc and moves along an arc of a circle, which avoids any lateral component of force on the shoes 40 and 44 capable of causing undesired friction on the drum 36.

The wheel cylinder 20, which is fixed to the outer shoe 44 (FIGS. 2 and 10), comprises two bores in line 52 and 53, the bore 53 having a larger diameter than the bore 52 and being separated from it by a shoulder 54.

The primary piston 34 (FIGS. 2 and 8) has two cylindrical bearing surfaces 55 and 56 provided respectively with sealing joints 57 and 58. The bearing surface 55 is engaged in the small bore 52, while the bearing surface 56 is engaged in the large bore 53. The piston 34 has a blind bore 59 open towards the bore 53, while communication holes 60 with the blind bore 59 are formed in the wall of the piston 34 in a region comprised between the joints 57 and 58.

The secondary piston 43 (FIGS. 2 and 9) also has two cylindrical bearing surfaces 61 and 62 respectively provided with sealing joints 63 and 64. The bearing surface 61 is engaged in the large bore 53, while the bearing surface 62 forms a tail engaged in the blind bore 59 of the primary piston 34.

The primary chamber 19 comprises the space of the blind bore 59 defined by the joint 64, the holes 60 and the space of the bores 52 and 53 surrounding the piston 34 and comprised between the joints 57 and 58. The annular section of the shoulder 54 is made greater than the circular section of the tail 62. The secondary chamber 24 comprises the space of the bore 53 which surrounds the piston 43 and which is comprised between the joint 63 on the one hand and the joints 58 and 64 on the other.

In the position of rest, that is to say when no pressure is applied on the pedal 12, the various hydraulic circuits are at atmospheric pressure by communication with the tank 16.

The pivot 46 which joins the two shoes 40 and 44 to each other is held applied by the spring 47 against the side 50 of the elongated slot 35.

The cylinder 20, connected to the shoe 44, cannot move towards the pivot 32 beyond a position which corresponds to the contact of the linings 45 with the drum 46, while the piston 43, connected to the shoe 40, cannot for its part be moved, farther away from the pivot 32, beyond a position which corresponds to the contact of the lining 41 with the drum 39.

Figure 7:
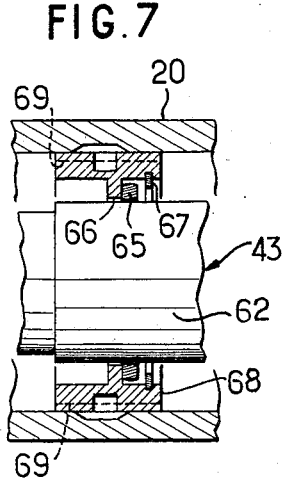
FIG. 7 is a detail view on a larger scale, showing the device for taking-up wear.

The cylinder 20 and the piston 43 are connected to each other by a coupling with play. This coupling with play comprises, as shown in FIGS. 2 and 7, an elastic keeper-ring 65 which grips the tail 62, and two spaced-apart abutments 66 and 67 which are fast with the cylinder 20, and between which the ring 65 is arranged. The abutments 66 and 67 are more particularly fixed to an annular member 68 which is in turn rigidly fixed in the cylinder 20 and which is provided with passages 69 permitting free intercommunication for the oil in the chamber 24 between the two sides of the member 68.

In the absence of hydraulic pressure, the shoes 40 and 44 have an appropriate degree of freedom with respect to the drum 36, which is defined by the travel of the keeper-ring 65 between the abutments 66 and 67.

The keeper-ring 65 is sufficiently tight round the tail 62 so as not to slip under the simple effect of the free vibration of the shoes 40 and 44 with respect to the drum 36.

It will be noted that the maximum play of the shoes is determined by the position of the ring 65 against the abutment 66, while the ring 65 is located against the other abutment 67 when the shoes are both in contact with the drum.

The brake linings 41 and 45 are subject to wear, and as and when this occurs, the coming into contact of the shoes with the drum under the effect of hydraulic pressure causes a forced travel of the ring 65 on the tail 62. At every instant therefore the maximum play is restored to the same conditions as when the linings are new.

The device 65, 66 and 67 thus ensures, by maintaining constant conditions of play in the released position, the function of an automatic device for taking up wear.

In other words, as best seen in FIG. 7, when the brakes are applied, piston 43 moves to the right as seen in FIG. 7 and cylinder 20 moves to the left as seen in FIG. 7, until the brakes are fully applied. Ring 65 will move forward and perhaps contact abutment 67. If the brake linings are worn, then ring 65 will move farther forward during brake application, and abutment 67 will slide ring 65 relatively to the left on piston 43. Thereafter, when the brakes are released, cylinder 20 will move to the right and piston 43 to the left relative to each other, until the ring 65 contacts the abutment 66. But as the ring 65 was slid to the rear on piston 43 by the abutment 67, the abutment 66 will be engaged by ring 65 and will stop the relative return movement before the piston 43 and cylinder 20 have returned all the way to their initial position. Viewed from the standpoint of the brake linings as seen in FIG. 2, this means that the brake shoes will not retreat from the drum 36 quite as far as they originally did. Thus, as the brake linings wear down, the rest or return position of the brake shoes advances toward the drum; and as a result, the distance between the worn surface of the brake linings and the drum remains fairly constant in the rest or return position. As a result, the stroke of brake pedal 12 also tends to remain constant.

During the course of braking on forward running (direction of the arrows F), volumes of oil are driven from the master-cylinder 10 through the conduits 18 and 22 into the primary chambers 19 and 19' of the front brakes 21 and 21'. The oil admitted to the chamber 19 first tends to push the piston 43 further away from the fixed point 32 and to push the cylinder 20 closer towards the said fixed point 32, which, while the shaft 46 still remains in contact with the side 50 of the slot 35, takes-up the play of the shoes 41 and 45 and brings the latter into contact with the drum.

When this contact is established, the piston 43 and the cylinder 20 can henceforth only move as a unit. They so move in the direction of the pivot 32 under the impulse of the driving forces developed by the rotation of the drum 36 in the direction F, while the rear brakes 27, 27' require to be supplied by the expulsion of oil at 24, 24'. At the same time, since the annular section of the shoulder 54 is greater than the full section of the tail 62, the chamber 19 increases slightly in volume, which results in a slight accompaniment of the brake pedal.

The shaft 46 leaves the side 50 of the elongated slot 35 and comes into an intermediate position in this slot between the sides 50 and 51. The front brakes operate with the two shoes 40 and 44 compressed, that is to say as self-applying brakes, this characteristic being modified by the self-releasing function of the master-cylinder 10, the chamber 15 of which is permitted, in the example shown, to diminish in volume when the brake pedal 12 is depressed.

It is by the piston 34 supported at the fixed point 32 that the braking reaction is finally absorbed, and this is effected by means of the fluid cushion in chamber 24 which is strongly compressed by the travel of the system 40, 43 in the direction F, whereas the position of the cylinder itself has no influence on this compression.

The high secondary pressure is the same in the chambers 24 and 24', since the conduit 23 forms a communication between them.

There is thus obtained a suitable balance by the secondary pressure at the level of the front brakes 21 and 21'. This secondary pressure is led by the conduit 23 to the rear brakes 27 and 27' which become applied with a self-releasing operation under high pressure, favourable to good balancing without risk of untimely locking.

In other words, when oil is admitted to primary chamber 19, it tends to increase the volume of chamber 19. Such volume increase can occur (see FIGS. 2 and 8 to 10) not only between the bottom of bore 59 of piston 34 and the end of part 62 of piston 43, but also between the outer rim 56 of piston 34 and the shoulder 54 of cylinder 20.

Since the piston 34 bears against the fixed point 32 and the piston 43 bears against the inner shoe 40 while the cylinder 20 is rigid with the outer shoe 44, and since a free clearance or play is provided at rest between the shoes 40, 41 and the drum 36, the volume increase between the bottom of bore 59 of piston 34 and the end of part 62 of piston 43 pushes piston 43 away from point 32 and tends to apply the inner shoe 40 against the drum 36 while the volume increase between the outer rim 56 of piston 34 and the shoulder 54 of cylinder 20 pushes cylinder 20 towards point 32 and tends to apply the outer shoe 44 against the drum 36, so that the play is absorbed and contact occurs between shoes 40, 41 and both sides 38, 39 of drum 36.

When this contact is established, the drag force due to rotation of drum 36 moves both shoes 40 and 44 in the direction of arrows F and since these shoes are connected with each other by pivot 46, they move as a unit. The pivot 46 leaves the side 50 of the elongated slot 35 and tends to come into an intermediate position in this slot between the sides 50 and 51.

During this motion, the piston 43 associated with shoe 40 and the cylinder 20 rigid with shoe 41 move also as a unit toward the fixed point 32. Since the piston 34 bears against the fixed point 32, the volume of chamber 19 tends to increase slightly due to the annular section of the shoulder 54 being greater than the full section of the tail 62 thus involving a slight accompaniment of the brake pedal, while the volume of chamber 19 defined by the fixed annular end of part 56 of piston 34 and by the movable part 61 of piston 43 tends to decrease.

Therefore oil in chamber 24 acts as an oil cushion by which the braking reaction is received while the so-called secondary pressure of the oil cushion 24 considerably increases.

During braking on reverse running (opposite direction to the arrow F), the reactions of the shoes 40 and 44 of the front brakes become reversed.

The shaft 46 is held applied against the side 50 of the elongated slot 35. The shoe 40 acts as a compressed shoe due to the action of the secondary piston 43, while the shoe 44 acts as a shoe under tension due to the action of the primary pressure at 19.

The secondary pressure at 24 is relatively small and the front brakes 21 and 21' are less powerful on reverse running than on forward running. However, the rear brakes 27 and 27' act as self-applying brakes and have a high braking capacity.

In the event of a failure of the secondary circuit 23 during braking on forward running, the shoes 40 and 44, driven by the drum 36, move until the shaft 46 comes into abutment against the side 51 of the slot 35. The braking is effected under good conditions of safety, with the shoe 40 in tension and the shoe 44 in compression, while the brakes 27 and 27' are not applied.

In case of failure of the secondary circuit 23 during braking on reverse running, the brakes 27 and 27' are no longer applied, but a braking effect is obtained from the brakes 21, 21', the shaft 46 of which is applied against 50, the shoe 40 being compressed and the shoe 44 in tension.

In the event of failure of a primary circuit, the front brake which is not defective acts normally and the rear brakes are applied. Only the shoe 40 of the defective brake takes any part in the braking. During forward running it is in tension and is acted upon by a high secondary pressure. On reverse running, it is in compression.

The invention is not limited to the form of construction described and shown but includes all its alternative forms.

What I claim is:

1. Brakes of the gripped-drum type, comprising a rotating annular member with an axial rim having inner and outer faces, a fixed plate, two shoes applicable in frictional contact against the axial rim of said annular member on radially opposite sides of said axial rim, and hydraulic control means comprising a cylinder carried by one of said shoes and two pistons one of which bears against the other of said shoes, the other piston bearing against said fixed plate, to cause said axial rim to be gripped between said two shoes, said two shoes having their extremities remote from the cylinder articulated one on the other on an axle that is movable relative to said fixed plate.

2. A brake as claimed in claim 1, said cylinder being fixedly secured to and movable with said one shoe, said other piston bearing against said fixed plate through a pivotal connection.

3. A brake as claimed in claim 1, and fixed abutment means with which said axle moves into abutment upon rearward running.

4. A brake as claimed in claim 1, said shoe that bears against the outer side of the rim carrying said cylinder and said shoe that bears against the inner side of the rim receiving the thrust of said one piston.

5. A brake as claimed in claim 1, and fixed abutment means with which said axle moves into abutment when said brake is not applied, and spring means urging said axle toward said fixed abutment means.

6. A brake as claimed in claim 1, said two pistons delimiting within said cylinder two chambers that are out of communication with each other, said two chambers communicating individually with two hydraulic circuits either of which serves as a safety device in the event of failure of the other circuit.

7. A brake as claimed in claim 1, in which said cylinder comprises a first bore and a second bore in alignment, the second bore having a larger diameter than the first bore, said other piston having two bearing surfaces one of which is engaged in said first bore and the other of which is engaged in said second bore, said one piston having two bearing surfaces one of which is engaged in said second bore and the other of which is engaged in a recess formed in said other piston, a primary chamber being defined both by the recess of said other piston limited by said one piston and by the space between said bores limited by the two bearing surfaces of said other piston, a secondary chamber being defined in the second bore between the two pistons, the differential annular section of said two bores being greater than the full section of the recess in said other piston, said primary and secondary chambers being respectively connected to two hydraulic circuits either of which acts as a safety device in the event of failure of the other circuit.

8. A brake as claimed in claim 1, and a device for taking up wear of the linings of the shoes, said device being disposed inside said cylinder and acting between said cylinder and said one piston.

9. A brake as claimed in claim 1, comprised in a braking installation of an automotive vehicle having plural axles at least one of which is provided with two said brakes and in which a master cylinder is adapted to drive equal or proportional volumes of fluid into primary chambers of the two brakes while secondary chambers of said brakes are interconnected by a hydraulic balancing circuit.

References Cited

UNITED STATES PATENTS

| | | | |
|---|---|---|---|
| 2,028,614 | 1/1936 | LaBrie | 188—78.33 |
| 2,119,903 | 6/1938 | Brisson et al. | 188—78.33 |
| 2,701,627 | 2/1955 | Murphy | 188—76 |
| 2,867,296 | 1/1959 | Requenes | 188—76 |
| 3,159,245 | 12/1964 | Dotto | 188—76 |

MILTON BUCHLER, Primary Examiner

THOMAS W. BUCKMAN, Assistant Examiner

U.S. Cl. X.R.

188—18, 76, 78, 152, 250